(12) United States Patent
Bienick

(10) Patent No.: US 8,899,704 B2
(45) Date of Patent: Dec. 2, 2014

(54) REFRIGERATOR SHELF

(75) Inventor: Craig Bienick, Jenison, MI (US)

(73) Assignee: Gemtron Corporation, Sweetwater, TN (US)

( * ) Notice: Subject to any disclaimer, the term of this patent is extended or adjusted under 35 U.S.C. 154(b) by 327 days.

(21) Appl. No.: 11/088,895

(22) Filed: Mar. 25, 2005

(65) Prior Publication Data

US 2006/0213849 A1    Sep. 28, 2006

(51) Int. Cl.
   *A47B 96/04*   (2006.01)
   *A47F 5/08*    (2006.01)
   *F25D 25/02*   (2006.01)
   *A47B 96/02*   (2006.01)

(52) U.S. Cl.
   CPC ............ *F25D 25/02* (2013.01); *A47B 96/028* (2013.01); *F25D 2325/022* (2013.01)
   USPC .......................................... 312/408; 211/90.2

(58) Field of Classification Search
   USPC ......... 211/90.02, 90.01, 126.5; 403/268, 269, 403/270, 272; 108/33, 147.11; 312/408
   See application file for complete search history.

(56) References Cited

U.S. PATENT DOCUMENTS

| | | | | |
|---|---|---|---|---|
| 870,439 A | * | 11/1907 | Kade | 248/243 |
| 4,453,533 A | | 6/1984 | Scheidler et al. | |
| 4,492,217 A | | 1/1985 | Scheidler | |
| 4,923,260 A | | 5/1990 | Poulsen | |
| 4,934,541 A | | 6/1990 | Bussan et al. | |
| 5,004,302 A | | 4/1991 | Stocking et al. | |
| 5,069,408 A | * | 12/1991 | Bessinger | 248/250 |
| 5,228,764 A | * | 7/1993 | Cherry et al. | 312/408 |
| 5,358,773 A | * | 10/1994 | Fujii et al. | 428/167 |
| 5,362,145 A | * | 11/1994 | Bird et al. | 312/408 |
| 5,403,084 A | | 4/1995 | Kane et al. | |
| 5,429,433 A | | 7/1995 | Bird et al. | |

(Continued)

FOREIGN PATENT DOCUMENTS

| | | |
|---|---|---|
| EP | 0527658 A1 | 2/1993 |
| EP | 0856712 A2 | 8/1998 |

(Continued)

OTHER PUBLICATIONS

Canadian Office Action dated Feb. 19, 2013 for Canadian Application No. 2,540,669.

(Continued)

*Primary Examiner* — Katherine Mitchell
*Assistant Examiner* — Jeremy Ramsey
(74) *Attorney, Agent, or Firm* — Ohlandt, Greeley, Ruggiero & Perle, LLP

(57) ABSTRACT

A shelf is defined by a tempered glass panel bonded to opposing flanges of a pair of metal shelf brackets carrying hooks for connection to and adjustment along vertical trackways in refrigerator compartments. Adhesive constitutes the sole means for maintaining the shelf substantially rigidly united. Each shelf bracket includes at least one abutment surface for engaging an edge of the shelf panel or a handgrip member carried thereby to assure perfect alignment between the components during curing of the adhesive. Each shelf bracket is defined by a shelf arm and a flange with the flanges having pockets housing the adhesive. The shelf arms may additionally include uppermost projections for engaging side edges of the shelf panel and/or at least one additional flange, such that side edge portions of the shelf panel can be housed between the pair of vertically spaced longitudinally offset flanges of each shelf bracket.

52 Claims, 7 Drawing Sheets

(56) References Cited

U.S. PATENT DOCUMENTS

| | | |
|---|---|---|
| 5,441,338 A | 8/1995 | Kane et al. |
| 5,454,638 A | 10/1995 | Bird et al. |
| 5,516,204 A | 5/1996 | Calvert et al. |
| 5,584,957 A | 12/1996 | Schultheis et al. |
| 5,660,777 A | 8/1997 | Herrmann et al. |
| 5,705,113 A | 1/1998 | Kane et al. |
| 5,735,589 A | 4/1998 | Herrmann et al. |
| 5,738,880 A | 4/1998 | Kane et al. |
| 5,947,574 A | 9/1999 | Avendano |
| 6,120,720 A | 9/2000 | Meier et al. |
| 6,196,141 B1 * | 3/2001 | Herron et al. ............ 108/108 |
| 6,422,673 B1 | 7/2002 | Bienick |
| 6,488,347 B1 | 12/2002 | Bienick |
| 6,604,800 B2 | 8/2003 | Hamilton |
| 6,679,573 B2 | 1/2004 | Bienick |
| 6,729,704 B2 | 5/2004 | Ames |
| 6,786,562 B2 | 9/2004 | Obrock et al. |
| 6,811,045 B1 * | 11/2004 | Masker et al. ............ 211/153 |
| 8,262,177 B2 * | 9/2012 | Picken et al. ............ 312/408 |
| 2003/0038571 A1 * | 2/2003 | Obrock et al. ............ 312/408 |
| 2003/0040243 A1 | 2/2003 | Ward |
| 2004/0005469 A1 | 1/2004 | Metz et al. |
| 2004/0056575 A1 | 3/2004 | Dietz et al. |
| 2004/0173549 A1 | 9/2004 | Herron et al. |

FOREIGN PATENT DOCUMENTS

| | | | |
|---|---|---|---|
| EP | 0913369 | 5/1999 | |
| IT | EP-0856712 A2 * | 5/1998 | ............ F25D 25/02 |
| JP | 09169990 | 1/1999 | |
| WO | 2006/044641 | 4/2006 | |
| WO | 2006044641 A2 | 4/2006 | |

OTHER PUBLICATIONS

Mexican Office Action dated Feb. 12, 2014 for Mexican application No. PA/a/2006/003323.

Extended European Search Report dated Aug. 16, 2013 for European application No. 06111509.3.

European Office Action dated Jun. 23, 2014 for European application No. 06111509.3.

European Office Action dated Apr. 24, 2014 for European application No. 06111509.3.

* cited by examiner

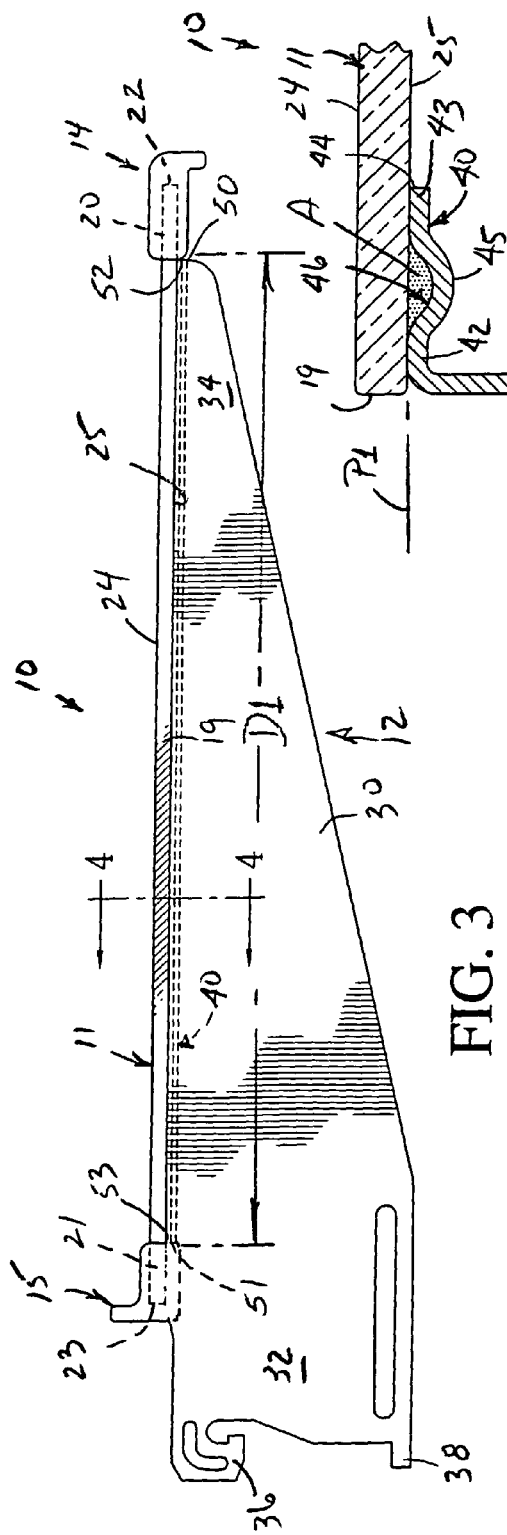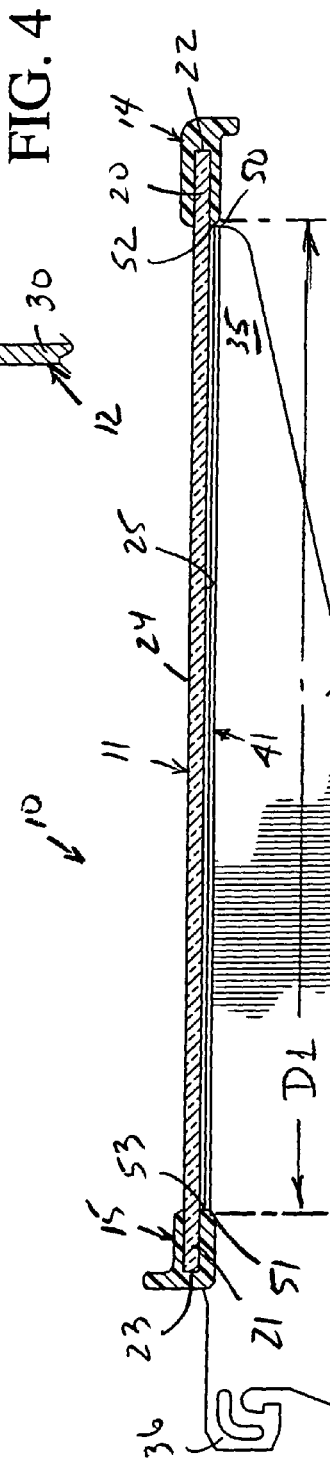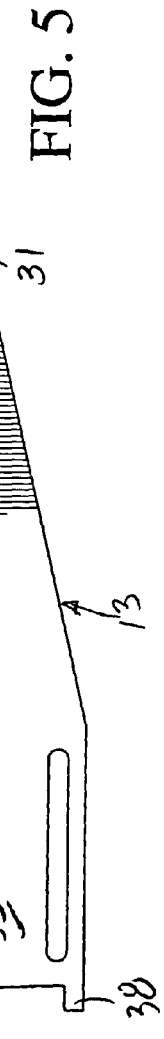

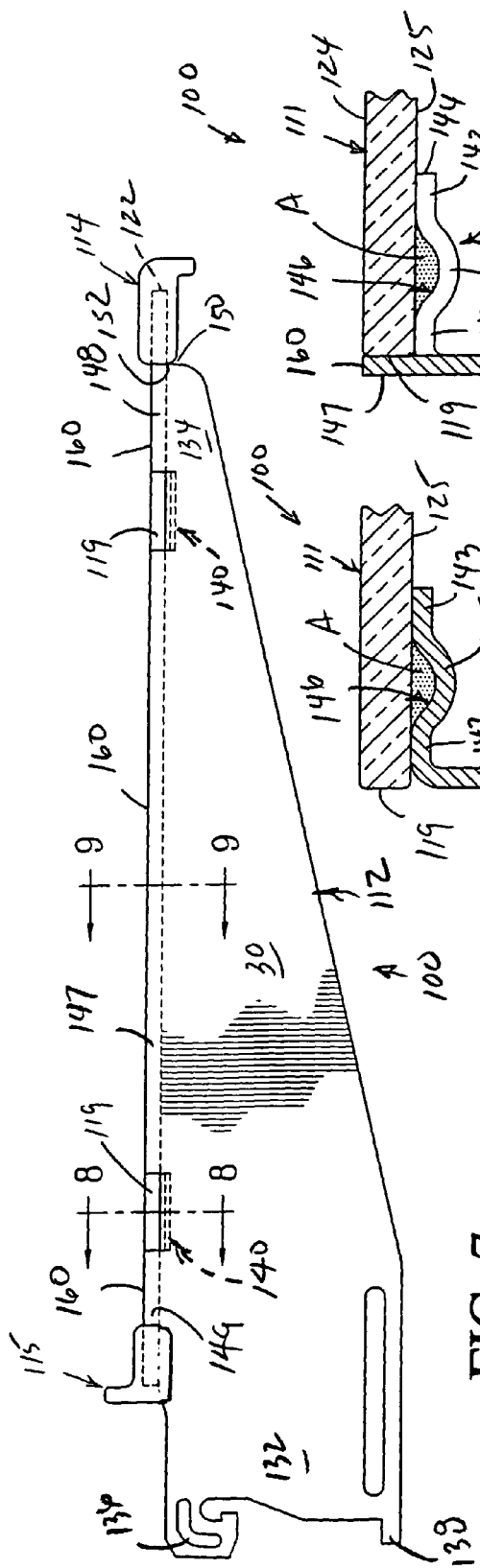
FIG. 7
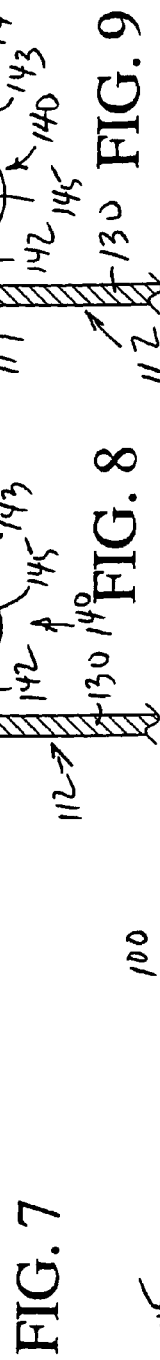
FIG. 8
FIG. 9
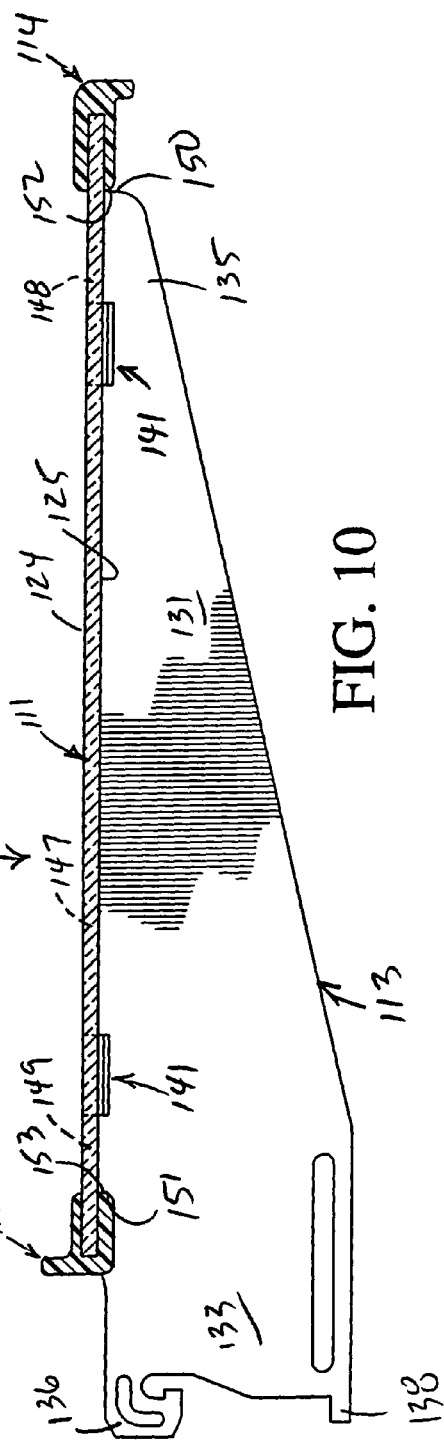
FIG. 10

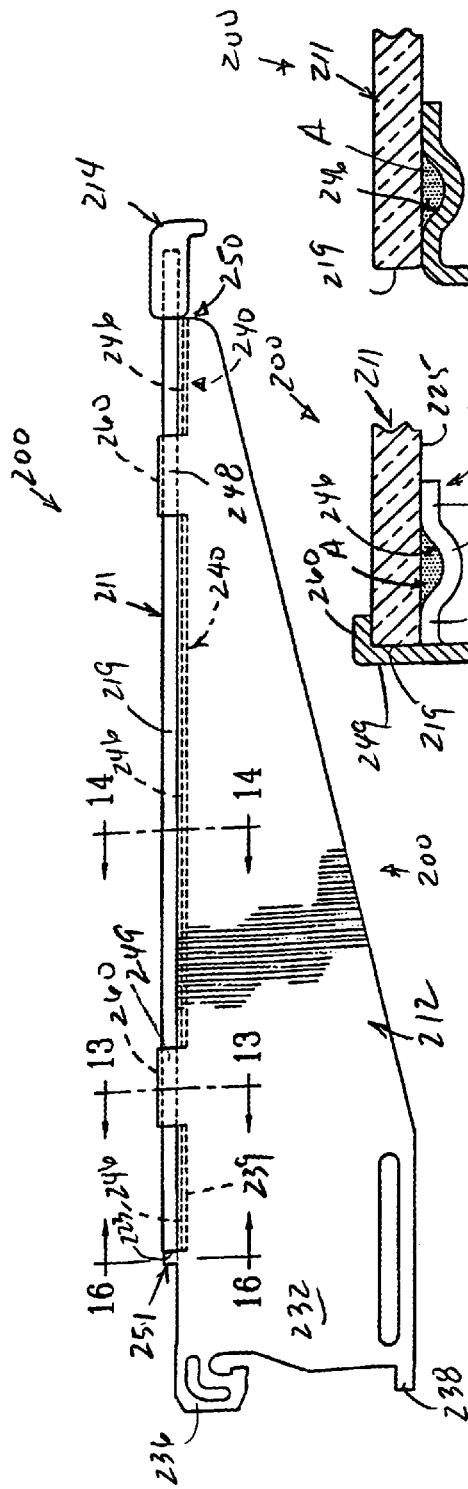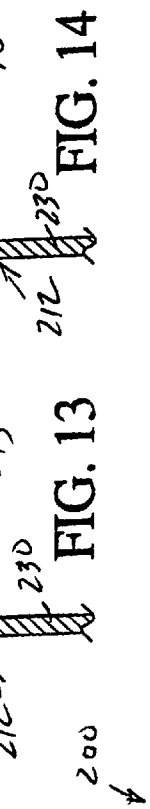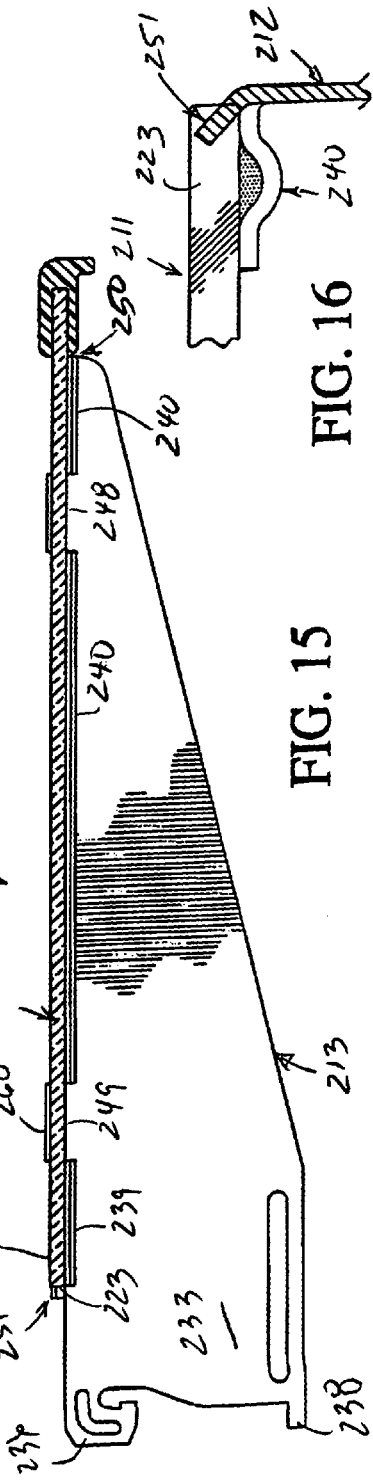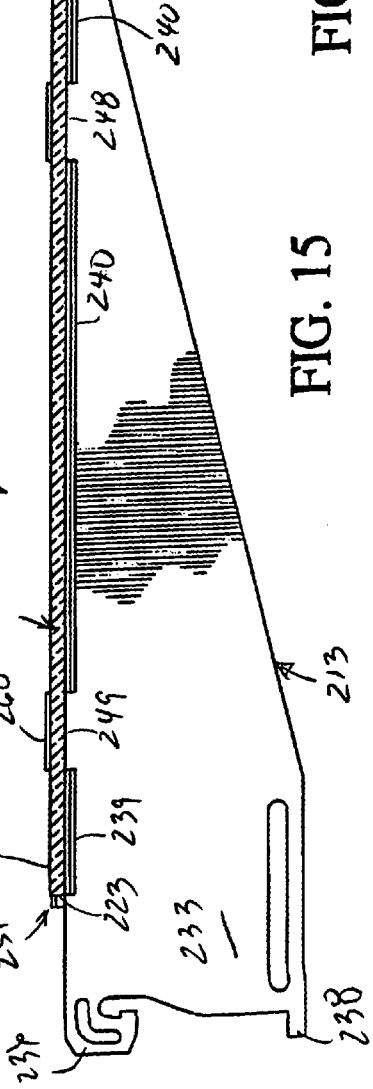

REFRIGERATOR SHELF

BACKGROUND OF THE INVENTION

This invention relates to shelving for refrigerators and the like, though it is equally capable of being utilized as a bookshelf or a shelf associated with most any type of furniture as a cantilevered shelf defined by a pair of shelf brackets and a shelf panel supported therebetween.

Shelves specifically designed for refrigerators are well known, and typical thereof is the cantilevered shelf of FIG. 1 of U.S. Pat. No. 5,362,145 issued on Nov. 8, 1994 to Kevin C. Bird et al. The cantilevered shelf is formed by a planar tempered glass shelf member or panel and a pair of metal support brackets which are united to each other by a molded polymeric/copolymeric synthetic resinous thermoplastic material encapsulation or rim. The rim is molded around the entire peripheral edge of the glass shelf member or panel and forms a spill dam for containing product spills occurring when the shelf or shelf assembly is in use in an associated refrigerator compartment. Such encapsulated shelves have been exclusively manufactured and sold by the assignee of the present application and are generally utilized in high-end/expensive refrigerators because of shelf rigidity, product drip/spillage protection and the extremely attractive aesthetic appearance achieved through the injection molding or encapsulation of the shelf brackets to the glass shelf panel.

FIG. 46 of the latter patent discloses another cantilevered shelf assembly in which a rim or encapsulation of polymeric/copolymeric synthetic plastic material totally encompasses an edge of a piece of tempered glass and is snap-attached by clips of the encapsulation or rim to front and rear frame members of a generally polygonal wire frame which includes side frame brackets and associated hooks for securing the shelf assembly to conventional slotted vertical tracks of a refrigerator compartment. The aesthetics of the latter shelf assembly are inferior to those of the shelf assembly first described herein, but the cost of manufacture and assembly can be less, particularly if assembled manually in countries outside the United States having lower wages, benefits, etc. However, the latter shelf assembly retains the liquid dam or anti-drip function which is a desirable feature, particularly for cantilevered shelves upon which might be supported products tending to drip or leak, particularly when the shelf is vertically adjusted.

In lieu of the metal shelf brackets or polygonal metal wire frame of U.S. Pat. No. 5,362,145, U.S. Pat. No. 6,488,347 issued on Dec. 3, 2002 in the name of Craig Bienick discloses a refrigerator shelf formed of but two pieces of material, namely, a glass shelf panel bounded by an integral, injection-molded, one-piece frame/encapsulation/rim of polymeric/copolymeric synthetic plastic material which includes integral shelf brackets and suspension hooks defined by the encapsulation/rim. This shelf assembly includes all of the advantages of the shelf assembly first described with respect to U.S. Pat. No. 5,362,145 and desirably excludes separate metal shelf brackets. However, the entire periphery of the encapsulation and particularly the side shelf arms must be reinforced to prevent adverse torquing characteristics which would occur if the polymeric/copolymeric shelf arms were made extremely thin. Therefore, though the shelf assembly of the latter patent excludes manual assembly costs, the latter could be offset by the added cost of the polymeric/copolymeric material utilized in the injection molding of the rim/encapsulation to effect rigidity/reinforcement thereof. Obviously, such conventional material is derived from petroleum and both availability and price stability thereof have always been a problem, particularly when quoting manufacturing costs of shelves one or more years into the future, as is customary under long-term customer purchase agreements.

A relatively simplistic refrigerator shelf is found in U.S. Pat. No. 4,923,260 issued on May 8, 1990 to Douglas Poulsen. The refrigerator shelf includes a pair of metal cantilevered shelf supports or brackets which are rigidly interconnected to each other by a rigid rear support rod or cross member. The glass shelf is inserted into a rear shelf retainer which carries a downwardly opening U-shaped clip which engages the rear rod. A U-shaped front cross member is also rigidly secured between front or free ends of the cantilevered shelf supports. Though relatively simplistic with respect to the various parts required to form the shelf, the welding of the front and rear cross members to the shelf brackets is expensive, as is the complex nature of the extruded rear clip.

The latter patents and those additionally specified in U.S. Pat. No. 6,488,347 establish the state of the cantilevered shelf art over which the present disclosure is considered to be a novel and unobvious departure.

SUMMARY OF THE INVENTION

In keeping with the foregoing, a novel shelf, particularly a cantilevered shelf which is adapted to be hooked to and vertically adjusted with respect to conventional slotted trackways in a refrigerator compartment, is manufactured from a pair of metal shelf brackets, a shelf panel preferably made of tempered glass, and adhesive for uniting the latter three shelf components in a substantially rigid manner. Through the utilization of but two metal shelf brackets which are appropriately blanked or severed from a planar piece of sheet metal, contoured/bent and, if desired, painted, bonding material is utilized to rigidly adhere upper surfaces of opposing flanges of the shelf brackets to an underside of the tempered glass panel. The flanges of each shelf bracket preferably include an upwardly opening reservoir or pocket in which the adhesive or bonding material can be located such that upon assembly of the glass panel side edges to the flanges, the adhesive/bonding material will not extrude laterally inwardly or outwardly of the flanges whereby aesthetics is enhanced due to the absence of visible extruded adhesive/bonding material inboard or outboard of the flanges.

In further accordance with the present invention, each cantilevered shelf arm of each bracket includes at least one projection which projects upwardly beyond its associated flange such that the projections engage side edges of the tempered glass panel to rigidify the assembly along the shelf bracket length thereof thereby precluding undesired torquing of the rigidly adhesively united shelf.

In further accordance with the present invention, each of the shelf arms includes at least a second flange spaced above the first flange and longitudinally offset therefrom which collectively afford upper and lower support to side edge portions of the tempered glass panel housed therebetween. The shelf of the present invention also includes means for locating the tempered glass shelf panel relative to each of the shelf brackets to assure perfect alignment of the components as the adhesive dries/bonds which thereby assures substantially perfect parallelism between the metal shelf arms or brackets which enhances the anti-torquing characteristics and rigidity of the shelf.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 3 is a side elevational view of the shelf of FIG. 1, and illustrates a front edge of the shelf bracket and the shelf panel support flange and a rear edge of the shelf panel support flange abuttingly engaging the respective front grip and rear product retention members to accurately locate the glass shelf or glass panel relative to the shelf bracket incident to a bonding operation.

FIG. 4 is a fragmentary enlarged cross-section view taken generally along line 4-4 of FIG. 3, and illustrates structural adhesive in the pocket of the flange for rigidly bonding an upper surface of the shelf panel support flange to a lower surface of the tempered glass shelf panel.

FIG. 5 is longitudinal cross-sectional view taken generally along line 5-5 of FIG. 1, and more clearly illustrates the manner in which front and rear edges of the shelf bracket engage the respective front grip and rear product retention members to locate each of the shelf brackets relative to the tempered glass panel during curing of the adhesive.

FIG. 7 is a side elevational view of the shelf of FIG. 6, and illustrates a front edge of the shelf bracket and the shelf panel support flange and a rear edge of the shelf panel support flange abuttingly engaging the respective front grip and rear product retention members to accurately locate the glass shelf or glass panel relative to the shelf bracket incident to a bonding operation.

FIG. 8 is a fragmentary enlarged cross-section view taken generally along line 8-8 of FIG. 7, and illustrates structural adhesive in a pocket of the flange for rigidly bonding an upper surface of the shelf panel support flange to a lower surface of the tempered glass shelf.

FIG. 9 is a fragmentary enlarged cross-section view taken generally along line 9-9 of FIG. 7, and illustrates structural adhesive in the pocket for rigidly bonding the shelf panel support flange to a lower surface of the tempered glass shelf and an uppermost projection of the shelf bracket for effecting edge abutting alignment of the glass panel.

FIG. 10 is a longitudinal cross-sectional view taken generally along line 10-10 of FIG. 6, and more clearly illustrates the manner in which front and rear edges of the shelf bracket engage the respective front grip and rear product retention members to accurately locate each of the shelf brackets relative to the tempered glass panel during curing of the adhesive.

FIG. 12 is a side elevational view of the shelf of FIG. 11, and illustrates a front edge of the shelf bracket and the shelf panel support flange and a rear edge of the shelf panel support flange abuttingly engaging the respective front grip member and shelf panel rear edge to locate the glass shelf or glass panel relative to the shelf bracket incident to a bonding operation.

FIG. 13 is a fragmentary enlarged cross-section view taken generally along line 13-13 of FIG. 12, and illustrates structural adhesive in a pocket of the shelf panel support flange for rigidly bonding the shelf panel support flange to a lower surface of the tempered glass shelf and an uppermost overlying flange engaging an upper surface of the glass shelf.

FIG. 14 is a fragmentary enlarged cross-section view taken generally along line 14-14 of FIG. 12, and illustrates structural adhesive in the pocket at a longitudinal portion of the shelf bracket which excludes the uppermost overlying flange.

FIG. 15 is a longitudinal cross-sectional view taken generally along line 15-15 of FIG. 11, and more clearly illustrates the manner in which front and rear edges of the shelf bracket engage the respective front grip member and shelf panel rear edge to locate each of the shelf brackets relative to the shelf panel during curing of adhesive and longitudinally alternating relationship of the shelf panel support and overlying flanges.

FIG. 16 is a fragmentary enlarged cross-sectional view taken generally along line 16-16 of FIG. 12, and illustrates the manner in which the locating projection or tab formed from the shelf bracket material is aligned for abutment with the rear terminal edge of the tempered glass shelf or panel.

DETAILED DESCRIPTION OF THE PREFERRED EMBODIMENTS

Figure 1:
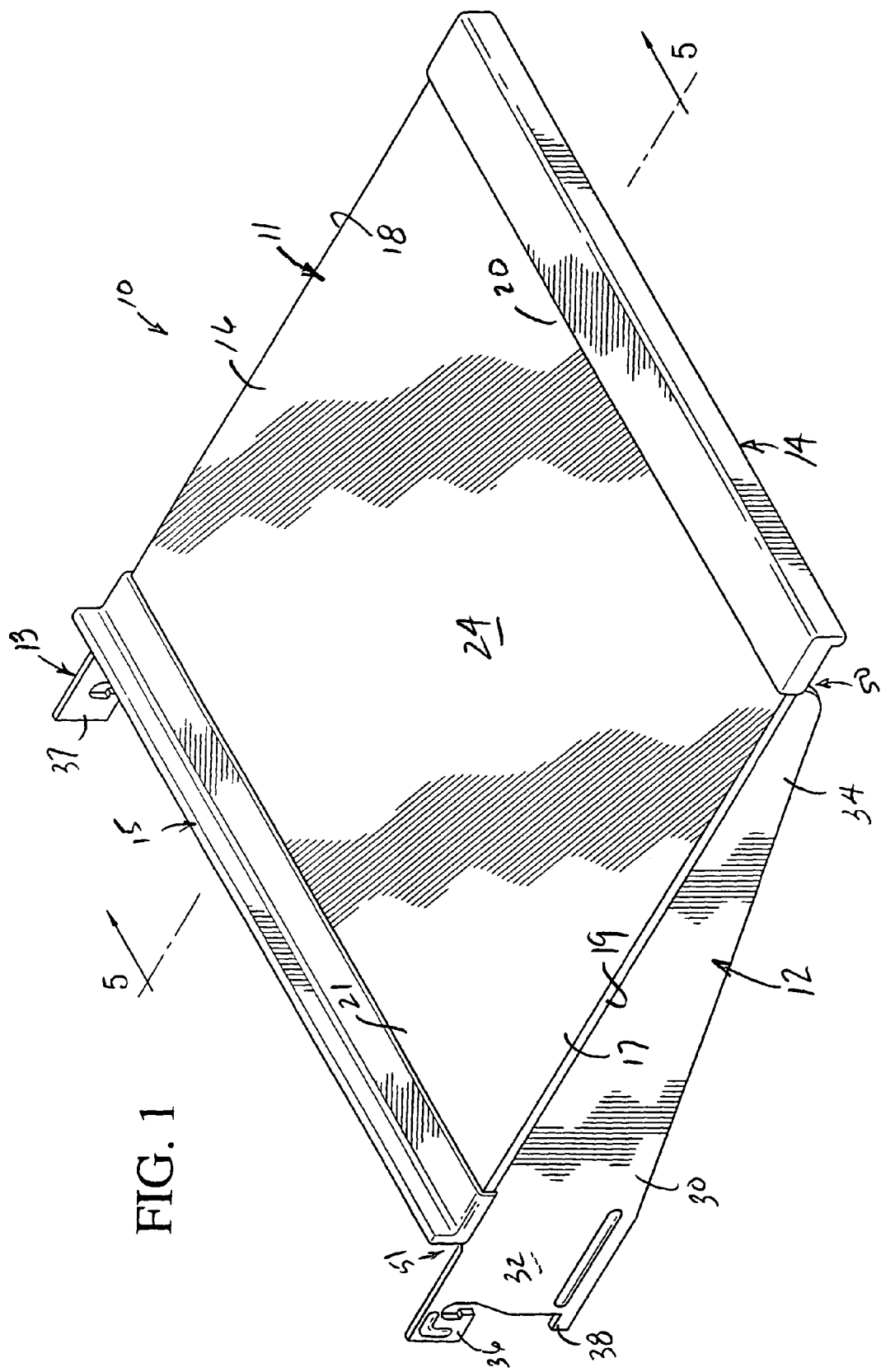
FIG. 1 is a top perspective view of a novel cantilevered refrigerator shelf constructed in accordance with this invention, and illustrates a pair of metal shelf brackets spanned by a transparent tempered glass shelf panel which in turn carries a front grip member and a rear product retention member each formed of synthetic polymeric/copolymeric synthetic plastic material.

A novel cantilevered shelf or shelf assembly constructed in accordance with this invention which is particularly adapted for utilization in fresh food or frozen food compartments of a refrigerator in association with slotted vertical trackways thereof is illustrated in FIGS. 1 through 5 of the drawings and is generally designated by the reference numeral 10.

The shelf 10 is constructed from three primary components, namely, a shelf panel 11 and a pair of metal cantilever side shelf brackets 12, 13 and secondary components in the form of a front grip or gripping member 14 and a rear product retention member 15 carried by the shelf panel 11.

The shelf panel 11 is preferably constructed from a polygonal piece of transparent tempered glass defined by side edge portions 16, 17 having respective side edges 18, 19 in substantially parallel relationship to each other and front and rear edge portions 20, 21 having respective front and rear edges 22, 23 (FIGS. 3 and 5) also in substantially parallel relationship to each other. The shelf panel 11 also includes an upper substantially planar surface 24 and a lower substantially planar surface 25. Each of edges 18, 19, 22, 23 is preferably ground and, if desired, either or both of the members 14, 15 can be eliminated.

Figure 2:
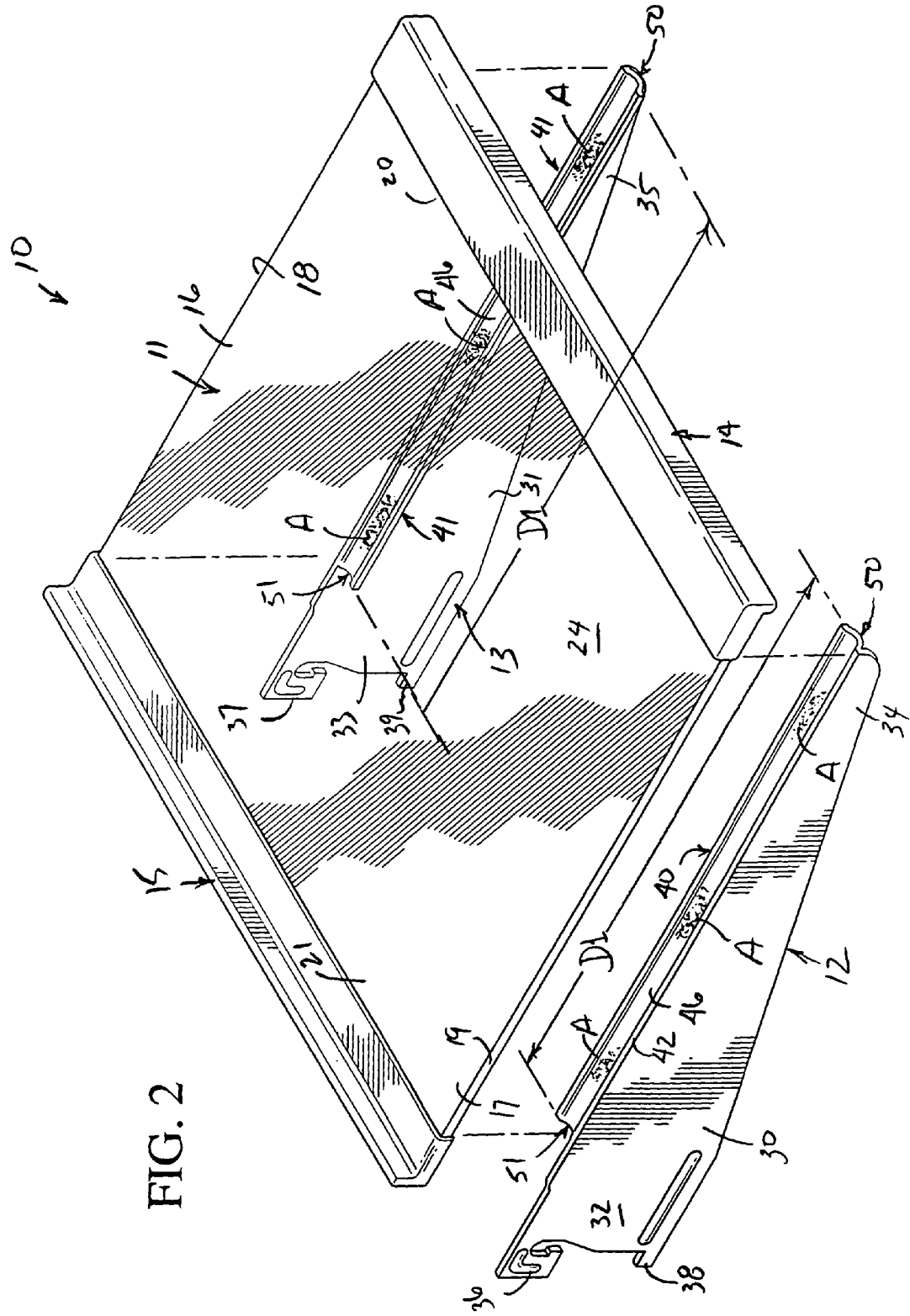
FIG. 2 is an exploded front perspective view of the shelf of FIG. 1, and illustrates each shelf arm in the form of a relatively flat side shelf bracket having a hook and reinforcement at a rear end thereof, and an inwardly directed shelf panel support flange defining along its length an upwardly opening pocket.
Figure 6:
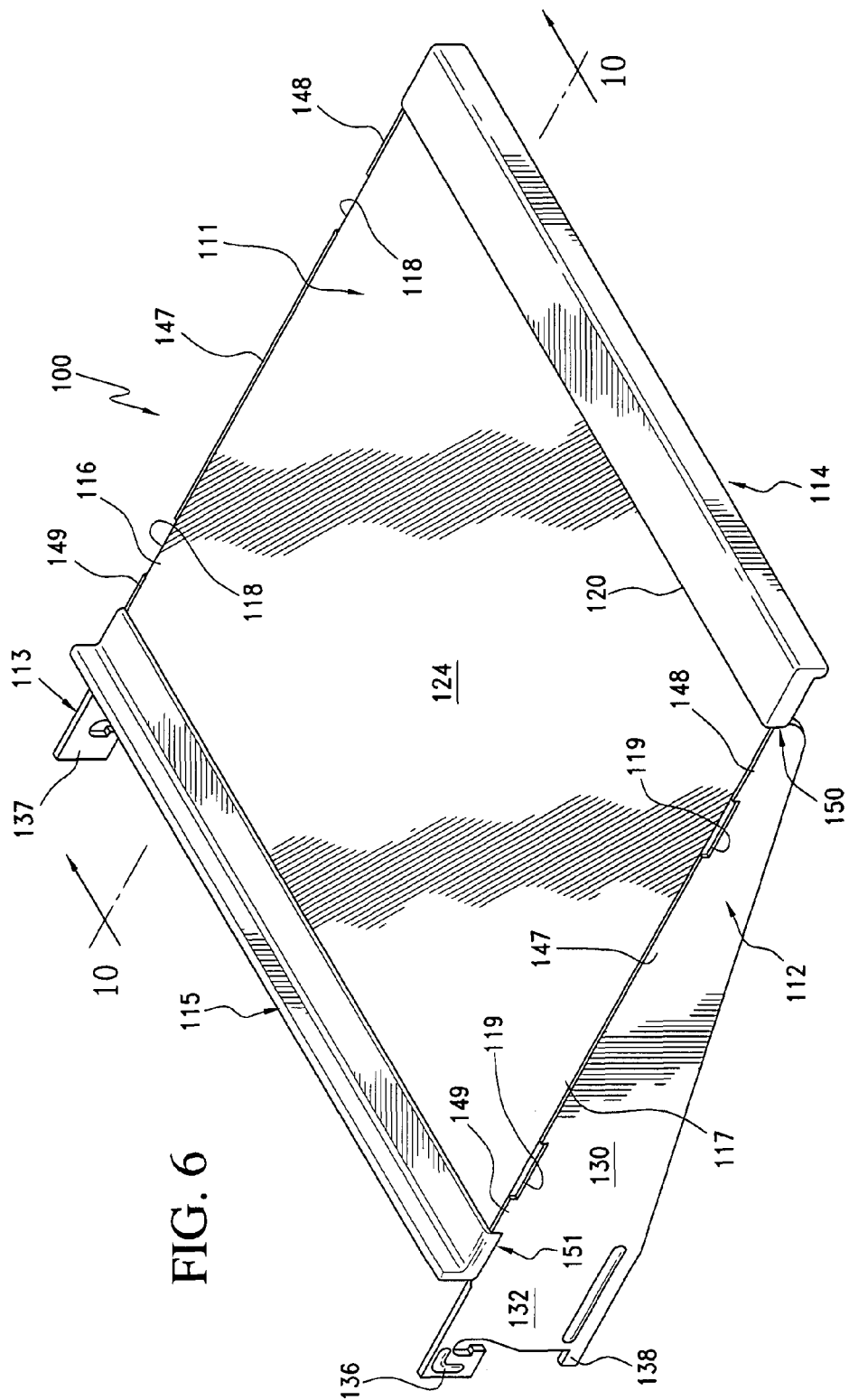
FIG. 6 is a top perspective view of another novel cantilevered refrigerator shelf constructed in accordance with this invention, and illustrates a pair of metal shelf brackets spanned by a transparent tempered glass shelf panel which in turn carries a front grip member and a rear product retention member each formed of synthetic polymeric/copolymeric synthetic plastic material.
Figure 11:
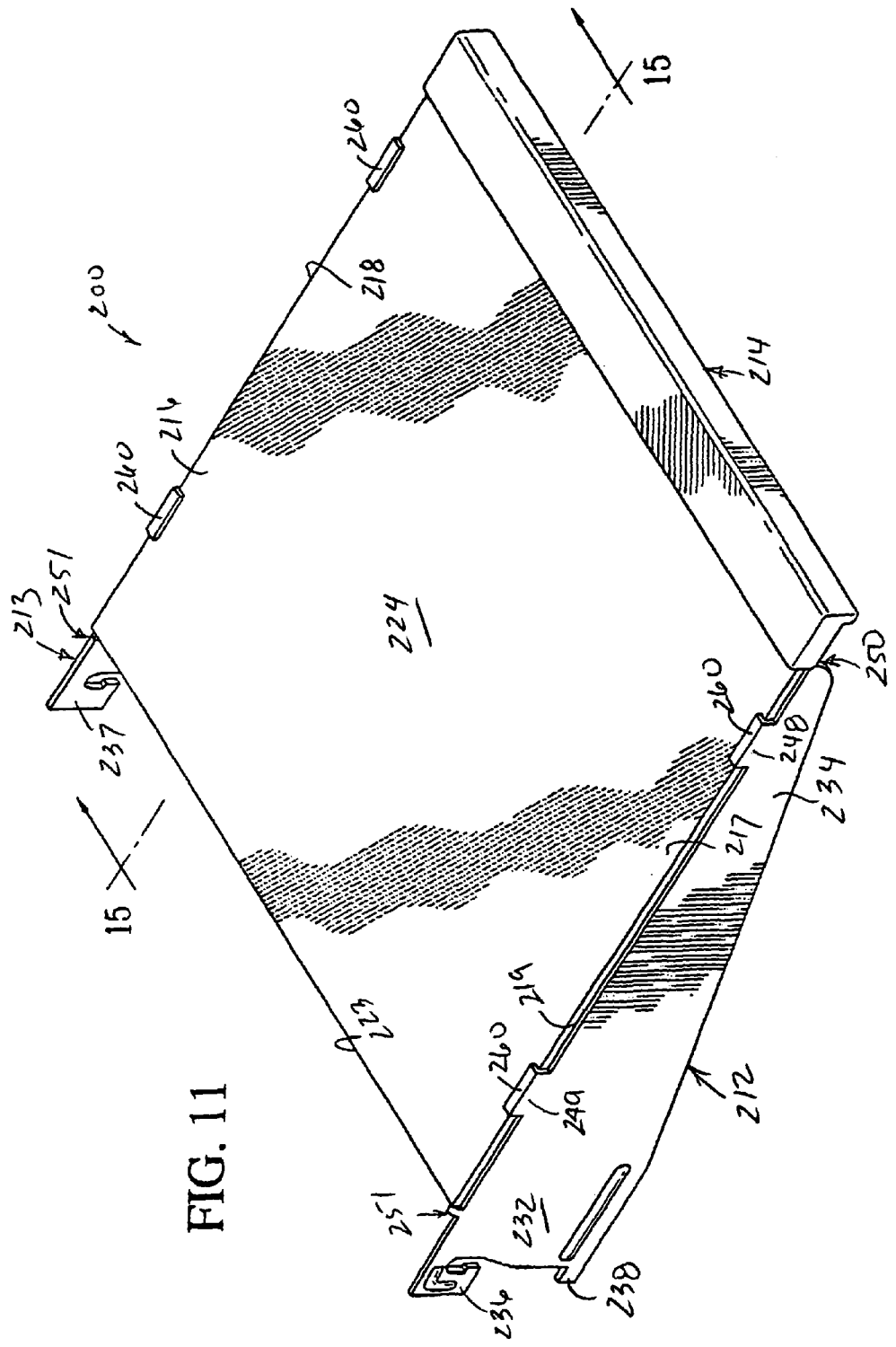
FIG. 11 is a top perspective view of another novel cantilevered refrigerator shelf constructed in accordance with this invention, and illustrates a pair of metal shelf brackets spanned by a transparent tempered glass shelf panel which in turn carries a front grip member formed of synthetic polymeric/copolymeric synthetic plastic material and a rear locating tab of the shelf brackets engaging a rear edge of the shelf panel.

The metal shelf brackets 12, 13 are substantially identical to each other and are each cut or blanked from a sheet of planar metallic material and formed to the configurations and cross-sections best illustrated in FIGS. 2 and 4 of the drawings. Each shelf bracket 12, 13 includes a cantilevered relatively flat shelf arm 30, 31 having a respective rear end portion 32, 33 and a respective front end portion 34, 35. The rear end portions 32, 33 of the respective shelf arms 30, 31 carry respective reinforced hooks 36, 37 and projections 38, 39 which are utilized in a conventional manner to secure the shelf 10 in slots of vertical trackways of a refrigerator compartment (not shown) in a conventional manner, particularly as is illustrated in FIG. 1 of U.S. Pat. No. 5,362,145.

Each shelf bracket 12, 13 additionally includes a shelf panel support flange 40, 41, respectively, which project laterally toward each other, as is most apparent from FIG. 2 of the drawings. Since the shelf panel support flanges 40, 41 are identical, the immediate description of the shelf panel support flange 40 is equally applicable to the shelf panel support flange 41. The shelf panel support flange 40 (FIG. 4) includes an inboard flange portion 42 most adjacent an upper longitudinal portion (unnumbered) of the shelf arm 30, an outboard flange portion 43 terminating at a lateral terminal edge 44 and a medial flange portion 45 between the flange portions 42, 43 of a generally upwardly opening U-shaped transverse cross-sectional configuration defining a reservoir or pocket 46 in which structural adhesive means A is introduced incident to assembling and bonding together the shelf panel 11 and the shelf brackets 12 and 13, as will be described more fully hereinafter.

A plane P1 (FIG. 4) is common to upper surfaces (unnumbered) of the inboard and outboard flange portions 42, 43, respectively, and is also common to the lower surface 25 of the shelf panel 11.

Each of the shelf panels support flanges 40, 41 include means 50, 51 (FIGS. 2, 3 and 5) defined by forwardmost and rearwardmost edges of the respective shelf panel support flanges 40, 41, for locating the shelf panel 11 accurately relative to the shelf brackets 12, 13 until such time as the adhesive A has cured to assure parallelism between the shelf brackets 12, 13, parallelism of the side edges 18, 19 of the shelf panel 11 relative to the shelf brackets 12, 13, and substantial normalcy between the shelf arms 30, 31 and the shelf panel 11.

The front grip member 14 and the product retention member 15 can either be injection molded upon the respective front and rear edge portions 20, 21 of the shelf panel 11 or can be manufactured and post-assembled by sliding the same upon the respective edge portions 20, 21 of the shelf panel 11. Members 14, 15 have lower transverse edges 52, 53 (FIGS. 3 and 5) which are spaced a distance D1 from each other. The distance D1 corresponds to the substantially identical distance D1 (FIG. 2) between the locating means 50, 51 of the shelf panel support flanges 12, 13. Therefore, as the shelf panel 11 is assembled relative to the shelf brackets 12, 13, as is readily visualized in FIG. 2 by imagining the latter components being moved toward one another to the position shown in FIG. 1, the transverse edges 52, 53 of the transverse members 14, 15, respectively, will abuttingly engage and thereby be located by the locating means or edges 50, 51, respectively, of the respective shelf brackets 12, 13. The adhesive A is preferably deposited in the pockets 46 of each of the shelf panel support flanges 40, 41 before the lower surface 25 of the glass shelf panel 11 is moved to the position shown in FIG. 4. The adhesive A can extend the entire length of each of the reservoirs or pockets 46 and slightly above the plane P1 (FIG. 1) before assembly. A bead of the adhesive A of a generally cylindrical cross-sectional configuration, as viewed in FIG. 4 though not illustrated therein, with an uppermost surface slightly above the plane P1 will be maintained in the latter configuration by surface tension. Thereafter, as the lower surface 25 of the glass shelf panel 11 moves toward the flange portions 42, 43 and in contact therewith the bead of adhesive A will flatten and expand laterally in both lateral directions, but will not be extruded or squeezed laterally outwardly and inwardly beyond either flange portions 42 or 43, respectively. The latter is highly desirable to preclude the necessity of cleaning extruded adhesive A from areas inboard of the shelf supporting flange edge 44 and/or outboard of the juncture between the shelf edges 18, 19 and the respective bracket arms 30, 31. However, such extrusion will not occur in accordance with this invention by placing beads of adhesive A in spaced relationship to each other along each of the pockets or reservoirs 46 in the manner illustrated in FIG. 2 of the drawings. In the latter case, should there be an excess of adhesive A in the pockets 46 of the shelf panel support flanges 40, 41, the same will be pushed, extruded or squeezed lengthwise along the pockets 46 because of the lesser longitudinal resistance to flow as opposed to lateral resistance to flow/ friction offered by the U-shaped flange wall portion 45. Hence, the pockets 46 define means for preventing lateral extrusion or flow in either direction of the adhesive A therefrom and promoting longitudinal extrusion or flow along the length of the pockets 46, thus assuring an aesthetically appearing shelf 10.

The adhesive A is preferably a structural adhesive/sealant, such as AM-47, which provides high strength and excellent adhesion while being tough, elastic and waterproof, all characteristics being requisite for utilization of the shelf 10 in refrigerator compartments, particularly in view of the moisture normally associated therewith, both by way of normal condensation and product spillage. The AM-47 adhesive can be used absent primers, is fast curing, is of extremely low shrinkage, is paint/enamel compatible and, when cured, satisfies all U.S. Federal Regulations, such as OSHA Hazardous Communication Standards.

Another novel cantilevered shelf or shelf assembly constructed in accordance with this invention which is also particularly adapted for utilization in fresh food or frozen food compartments of a refrigerator in association with slotted vertical trackways thereof is illustrated in FIGS. 6 through 10 of the drawings and is generally designated by the reference numeral 100. Components of the shelf assembly 100 which correspond to like components of the shelf assembly 10 have been prefixed by "100" to identify identical structure without specifically describing the same. However, as in the case of the shelf or shelf assembly 10, the shelf 100 is constructed from three primary components, namely, a shelf panel 111 and a pair of metal cantilevered side shelf brackets 112, 113 and secondary components in the form of a front grip or gripping member 114 and a rear product retention member 115 carried by the shelf panel 11.

The most significant difference between the two shelves 10, 100 resides in the fact that while the shelf brackets 12, 13 each included a single relatively long shelf panel supporting flange 40, 41, respectively, the corresponding shelf brackets 112, 113 of the shelf 100 each include a pair of shelf panel supporting flanges 140, 140; 141, 141; respectively. The shelf panel supporting flanges 140, 141 are in opposite opposing relationship to the shelf panel supporting flanges 141, 141, as is most readily visualized by comparing FIGS. 7 and 10 of the drawings. Upper surfaces (unnumbered) of the shelf panel support flanges 140, 141 lie in a common plane corresponding to the plane P1 of FIG. 4 which lies in the plane of the lower surface 125 of the glass panel 111 (FIGS. 8 and 9). Each shelf panel support flange 140, 141 defines an upwardly opening reservoir or pocket 146 in which the structural adhesive A is introduced incident to an assembling and bonding operation corresponding to that heretofore described with respect to the shelf 10. However, the shelf or shelf assembly 100 also includes means 147, 148 and 149 in the form of upper edge portions or upper projections of the respective shelf arms 30, 31 which end in an uppermost common longitudinal edge or edge portion 160.

As is best illustrated in FIG. 9 of the drawings, a plane horizontally passing through the upper surface 124 of the glass panel 11 also passes through the common edge 160 of the upwardly projecting portions 147, 148, 149. The panel support flanges 140, 141 at the forward end portions 134, 135 of the respective shelf brackets 112, 113 are located between the upward projecting portions or upwardly projecting edges 147, 148, while the shelf panel support flanges 140, 141 at the rear end portions 30, 33 of the respective shelf brackets 112, 113 are positioned between the upwardly directed projections or projecting edge portions 147, 149. The projecting portions 147 through 149 define abutment means or locating means for the shelf panel 111 incident to bonding the same to the adhesive A upon the flanges 140, 140; 141, 141. The side edges 118, 119 of the glass panel 111 are brought into contiguous or contacting relationship with inner surfaces (unnumbered) of the flat shelf arms 130, 131 of the respective shelf brackets 112, 113, in the manner best illustrated in FIG. 9 of the drawings. The latter contact assures that the side shelf brackets 112, 113 are in parallel relationship to each other and are also normal to a horizontal plane through the glass panel 111 until such time as the adhesive A sets or cures. Once the latter occurs, an extremely rigid right-angle connection is effected along the length of each shelf bracket 112, 113 and the side edge portions 116, 117 of the shelf panel 111 to form an extremely rigid shelf 100 which is not subject to distortion, cocking, torquing, etc., during vertical adjustment and/or when under product loading.

Another novel cantilevered shelf or shelf assembly constructed in accordance with this invention is illustrated in FIGS. 11 through 16 of the drawings and is generally designated by the reference numeral 200. Components of the shelf assembly 200 which correspond to like components of the shelf assemblies or shelves 10 and 100 have been similarly designated to avoid duplication of description.

The shelf or shelf assembly 200 differs from the shelves 10, 100 in three aspects, namely, (1) each metal shelf bracket 212, 213 includes only a pair of upwardly projecting edge portions or projections 248, 249 which results in three spaced shelf panel support flanges 239, 240 and 241 along each shelf bracket 212, 213, (2) upper most edge portions 260 of the upper edge projections 248, 249 are bent inwardly in aligned opposing relationship with each other (FIG. 11) in overlying relationship to the glass panel 211, and (3) each shelf bracket 212, 213 includes locating means 251 in the form of a tab disposed at an angle of approximately 45 degrees (FIG. 17) to its associated shelf panel support flange 240, 241 into alignment with and being abutted by the rear edge 223 of the glass panel 211.

As is most readily apparent from FIG. 13 of the drawings, since the flanges 260, 239; 260, 240 and 260, 241 snugly receive therebetween the side edge portions 216, 217 of the glass panel 211, added rigidity is provided the shelf 200 upon the setting/curing of the adhesive A. The latter is augmented by additional adhesive which can be located in the reservoirs of all three shelf panel support flanges 239, 240 and 241 associated with each shelf bracket 212, 213, thereby providing additional rigidity than that of the shelf 100 which includes only the two pair of relatively short shelf panel supporting flanges 140, 141 (FIGS. 7 and 10). Finally, the locating flanges or tabs 250 assure that the glass shelf 211 cannot move leftward from the position shown in FIGS. 12 and 15 with respect to the shelf brackets 212, 213, thereby additionally assuring that all components are assembled in the desired parallel/normal relationships heretofore described.

Although a preferred embodiment of the invention has been specifically illustrated and described herein, it is to be understood that minor variations may be made in the apparatus without departing from the spirit and scope of the invention, as defined by the appended claims.

What is claimed is:

1. A refrigerator shelf assembly for mounting to an inside wall of a refrigerator, comprising:
    a support structure consisting of a first shelf bracket for mounting to the inside wall of the refrigerator and a second shelf bracket for mounting to the inside wall of the refrigerator, the second shelf bracket being substantially parallel to the first shelf bracket;
    the assembly further comprising a shelf panel having a front edge, a rear edge, a pair of side edges, and a planar lower surface,
    wherein the support structure is adhesively bonded to the planar lower surface of the shelf panel so that the refrigerator shelf assembly is substantially rigidly united,
    wherein each of the first shelf bracket and the second shelf bracket is a single-piece unitary component.

2. The refrigerator shelf assembly of claim 1, wherein each of the first and second shelf brackets comprises a shelf arm and a shelf panel support flange,
    wherein each shelf arm is disposed in a spaced relationship to the other shelf arm, and wherein each shelf panel support flange is disposed in a first substantially common plane that is substantially normal to its associated shelf arm, the refrigerator shelf assembly further comprising an adhesive located between an upper surface of each shelf panel support flange and the planar lower surface of the shelf panel for adhesively bonding the same to each other,
    wherein the adhesive bonding between each shelf support flange and the shelf panel maintains the shelf substantially rigidly united.

3. The refrigerator shelf assembly of claim 2, wherein each shelf panel support flange comprises a reservoir opening in a direction toward the shelf panel planar lower surface, and wherein the adhesive is at least partially in the reservoir.

4. The refrigerator shelf assembly of claim 2, further comprising means associated with each of the first and second shelf brackets for locating the shelf panel relative thereto.

5. The refrigerator shelf assembly of claim 2, wherein the shelf panel is tempered glass.

6. The refrigerator shelf assembly of claim 2, further comprising a polymeric/copolymeric front gripping member, wherein the gripping member comprises a channel in which the front edge of the shelf panel is located.

7. The refrigerator shelf assembly of claim 3, wherein each shelf arm comprises an upper edge portion projecting upwardly beyond its shelf panel support flange, and each side edge of the shelf panel are contiguous an adjacent shelf arm upper edge portion.

8. The refrigerator shelf assembly of claim 3, further comprising means associated with each of the first and second shelf brackets for locating the shelf panel relative thereto.

9. The refrigerator shelf assembly of claim 4, wherein the shelf panel locating means is defined by abutment means of each shelf arm for abutting against the shelf panel.

10. The refrigerator shelf assembly of claim 4, wherein the shelf panel locating means is defined by abutment means at a front end portion of each shelf arm for abutting against the shelf panel.

11. The refrigerator shelf assembly of claim 4, wherein the shelf panel locating means is defined by abutment means at a rear end portion of each shelf arm for abutting against the shelf panel.

12. The refrigerator shelf assembly of claim 4, wherein the shelf panel locating means is defined by abutment means at front and rear end portions of each shelf arm for abutting against the shelf panel.

13. The refrigerator shelf assembly of claim 4, wherein the shelf panel locating means is defined by an edge of each shelf arm.

14. The refrigerator shelf assembly of claim 4, wherein the shelf panel locating means is defined by an edge of each shelf arm located contiguous a front end of each shelf arm.

15. The refrigerator shelf assembly of claim 4, wherein the shelf panel locating means is defined by an edge of each shelf arm located contiguous to a rear end of each shelf arm.

16. The shelf claim 4, wherein the shelf panel locating means is defined by a pair of edges of each shelf arm located one each contiguous to front and rear ends of each shelf arm.

17. The refrigerator shelf assembly of claim 3, wherein the adhesive is one or more separate beads of adhesive along the length of the reservoir.

18. The refrigerator shelf assembly of claim 1, wherein each of the first and second shelf brackets is made from one material bounded by a continuous uninterrupted peripheral edge.

19. The refrigerator shelf assembly of claim 1, wherein the adhesive is elastic and waterproof.

20. The refrigerator shelf assembly of claim 1, wherein the shelf panel contacts each of the upper surfaces of each shelf panel support flange when adhesively bonded thereto.

21. A refrigerator shelf assembly, comprising:
a pair of shelf brackets, wherein each of the pair of shelf brackets is a separate, single-piece unitary component, wherein each of the pair of shelf brackets comprises a shelf arm and a shelf panel support flange, wherein each shelf arm is disposed in substantially parallel spaced relationship to the other of the shelf arms, and wherein each shelf panel support flange is disposed in a substantially common plane that is substantially normal to its associated shelf arm;
a shelf panel having a planar lower surface; and
an adhesive located between an upper surface of each shelf panel support flange and the planar lower surface of the shelf panel for directly adhesively bonding the same to each other so that the adhesive is the sole connection between the shelf panel and each of the pair of shelf brackets,
wherein the refrigerator shelf assembly is used in a refrigerator.

22. The shelf of claim 21, wherein each shelf arm comprises an upper longitudinally extending edge portion, and each shelf panel support flange is defined by a portion of its associated upper longitudinally extending edge portion,
wherein each of the pair of shelf brackets comprises a second flange, wherein each second flange is disposed in a second substantially common plane that is substantially normal to its associated shelf arm, so that the common planes define a distance corresponding substantially to the thickness of the shelf panel,
wherein the shelf panel comprises side edge portions that are each disposed between one each of the shelf panel supports and second flanges, and
wherein the shelf panel support and second flange of each shelf are longitudinally offset relative to each other.

23. A shelf, comprising:
a pair of shelf brackets for mounting inside a refrigerator, wherein each of the pair of shelf brackets is a separate, single-piece unitary component, wherein each of the pair of shelf brackets comprises a shelf arm and a shelf panel support flange, wherein each shelf arm is disposed in substantially parallel spaced relationship to the other shelf arm, wherein each shelf panel support flange is disposed in a substantially common plane with the other, and which is substantially normal to its associated shelf arm;
a shelf panel comprising four sides and a planar lower surface; and
an adhesive located between an upper surface of each shelf panel support flange and a planar lower surface of the shelf panel for directly adhesively bonding the same to each other so that each of the pair of shelf brackets is connected by the adhesive between each shelf panel support flange and the shelf panel,
wherein there is no additional shelf bracket connecting said pair of shelf brackets to one another.

24. The refrigerator shelf assembly of claim 23, wherein each shelf arm comprises an upper edge portion projecting upwardly beyond its shelf panel support flange, and
wherein each side edge portion of the shelf panel is contiguous an adjacent shelf arm upper edge portion.

25. The refrigerator shelf assembly of claim 23,
wherein each shelf arm comprises an upper longitudinally extending edge portion,
wherein each shelf panel support flange is defined by a portion of its associated upper longitudinally extending edge portion,
wherein each of the pair of shelf brackets comprises a second flange, wherein the second flange is disposed in a second substantially common plane that is substantially normal to its associated shelf arm, so that the common planes define a distance corresponding substantially to the thickness of the shelf panel, and
wherein the shelf panel includes two side edge portions, one each disposed between one each shelf panel support and second flange.

26. The refrigerator shelf assembly of claim 25, wherein each shelf panel support flange and each second flange of each of the pair of shelf brackets is longitudinally offset relative to each other.

27. The refrigerator shelf assembly of claim 25, wherein each of the pair of shelf brackets comprises an additional one of the shelf panel support flange and the second flange, and the additional flange lies in one of the substantially common planes.

28. The refrigerator shelf assembly of claim 25, wherein each of said the pair of shelf brackets comprises an additional shelf panel support flange, and the additional shelf panel support flange lies in the first substantially common plane.

29. The refrigerator shelf assembly of claim 25, wherein each of the pair of shelf brackets includes a third flange, and each of the third flanges lies in the common plane of the second flanges.

30. The refrigerator shelf assembly of claim 24, further comprising an upper terminal edge of each upper edge portion that lies in a plane substantially common to a plane of an upper surface of the shelf panel.

31. The refrigerator shelf assembly of claim 25, wherein each of the pair of shelf brackets includes an additional shelf panel support flange, and each of the additional shelf panel support flanges lies in the first common plane.

32. The refrigerator shelf assembly of claim 24, further comprising means associated with each of the first and second shelf brackets for locating the shelf panel relative thereto.

33. The refrigerator shelf assembly of claim 24,
wherein each of the first and second shelf brackets comprises a second flange, wherein each second flange is disposed in a second substantially common plane which is substantially normal to its associated shelf arm, so that the common planes define a distance corresponding substantially to the thickness of the shelf panel, and
wherein the shelf panel comprises side edge portions, each disposed between each of the shelf panel support flanges and the second flanges.

34. The refrigerator shelf assembly of claim 25, further comprising means associated with each of the first and second shelf bracket for locating the shelf panel relative thereto.

35. The refrigerator shelf assembly of claim 26, further comprising means associated with each of the first and second shelf brackets for locating the shelf panel relative thereto.

36. The refrigerator shelf assembly of claim 27, further comprising means associated with each of the first and second shelf brackets for locating the shelf panel relative thereto.

37. The refrigerator shelf assembly of claim 28, further comprising means associated with each of the first and second shelf brackets for locating the shelf panel relative thereto.

38. The refrigerator shelf assembly of claim 29, further comprising means associated with each of the first and second shelf brackets for locating the shelf panel relative thereto.

39. The refrigerator shelf assembly of claim 31, further comprising means associated with each of the first and second shelf brackets for locating the shelf panel relative thereto.

40. The refrigerator shelf assembly of claim 34, wherein the shelf panel locating means is defined by abutment means of each shelf arm for abutting against the shelf panel.

41. The refrigerator shelf assembly of claim 34, wherein the shelf panel locating means is defined by an edge of each shelf arm.

42. The refrigerator shelf assembly of claim 34, wherein the shelf panel locating means is defined by an edge of each shelf arm located contiguous to a front end of each shelf arm.

43. The refrigerator shelf assembly of claim 34, wherein the shelf panel locating means is defined by an edge of each shelf arm located contiguous to a rear end of each shelf arm.

44. The refrigerator shelf assembly of claim 34, wherein the shelf panel locating means is defined by a pair of edges of each shelf arm located one each contiguous to front and rear ends of each shelf arm.

45. A refrigerator shelf assembly comprising:
a pair of metal shelf brackets, wherein each of the pair of shelf brackets is a separate, single-piece unitary component, wherein each of the pair of shelf brackets comprises a shelf arm and a shelf panel support flange, wherein each shelf arm is disposed in substantially parallel spaced relationship to each other, wherein each shelf panel support flange is disposed in a substantially common plane which is substantially normal to its associated shelf arm;
a tempered glass shelf panel, the shelf panel comprising two substantially parallel sides opposite one another and a planar lower surface; and
an adhesive located between an upper surface of each shelf panel support flange and a planar lower surface of the shelf panel for directly adhesively bonding the same to each other so that each of the pair of shelf brackets is connected by the adhesive along one of the parallel sides and not along any other side of the shelf panel, and
wherein the adhesive connection between the pair of shelf brackets and the shelf panel maintains the shelf substantially rigidly united.

46. The shelf of claim 45, further comprising a front grip member on a front edge portion of the shelf panel.

47. A refrigerator shelf assembly for mounting to an inside wall of a refrigerator, comprising:
a support structure consisting of a first shelf bracket for mounting to the inside wall of the refrigerator and a second shelf bracket for mounting to the inside wall of the refrigerator, wherein the second shelf bracket is separate from the first shelf bracket,
the assembly further comprising a shelf panel having a pair of side edges, a front edge, a rear edge, and a planar lower surface; and
an adhesive located between the planar lower surface of the shelf panel and each of the first shelf bracket and the second shelf bracket of the support structure so that the adhesive bonding between each of the first shelf bracket and the second shelf bracket and the shelf panel maintains the shelf assembly substantially rigidly united,
wherein each of the first shelf bracket and the second shelf bracket is a single-piece unitary component.

48. The refrigerator shelf assembly of claim 47, wherein each of the first and second shelf brackets comprise flanges for supporting the shelf panel, and wherein the adhesive is located between an upper surface of each flange and the planar lower surface of the shelf panel.

49. The refrigerator shelf assembly of claim 48, wherein each flange comprises a reservoir opening in a direction toward the planar lower surface of the shelf panel, and wherein the adhesive is at least partially in the reservoir.

50. The refrigerator shelf assembly of claim 47, wherein the shelf panel is tempered glass.

51. The refrigerator shelf assembly of claim 47, further comprising a front gripping member, wherein the gripping member comprises a channel in which the front edge portion of the shelf panel is located.

52. The refrigerator shelf assembly of claim 47, further comprising means associated with each of the first and second shelf brackets for locating the shelf panel relative thereto.

* * * * *